July 18, 1967  P. R. HEFLER ET AL  3,331,394
GAS VALVE
Filed Nov. 23, 1964  2 Sheets-Sheet 1
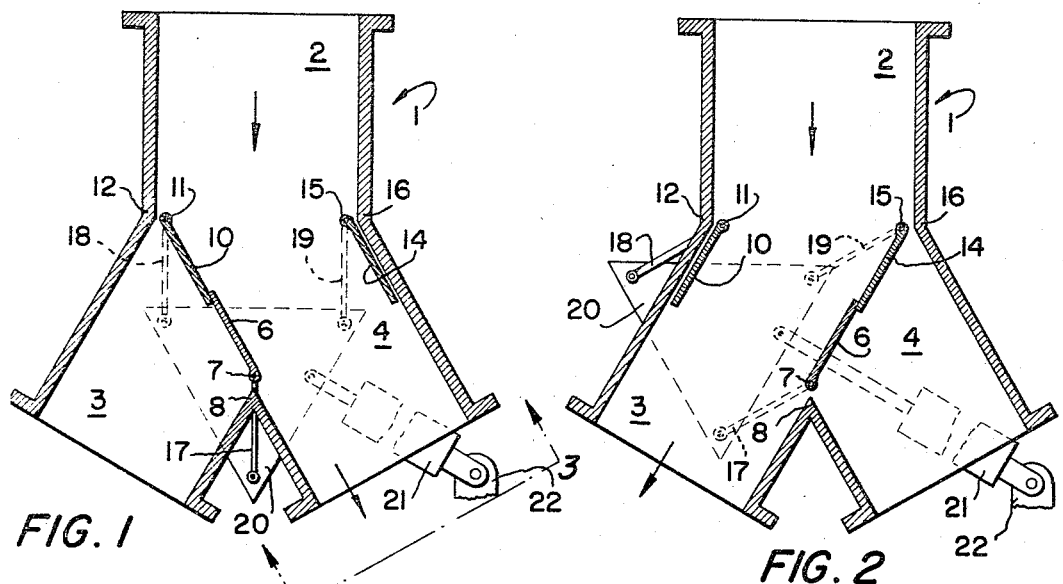
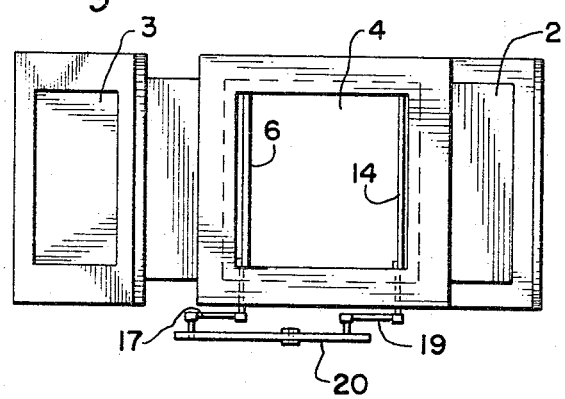
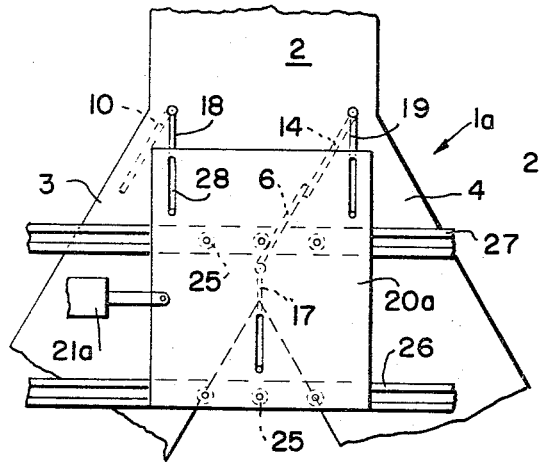
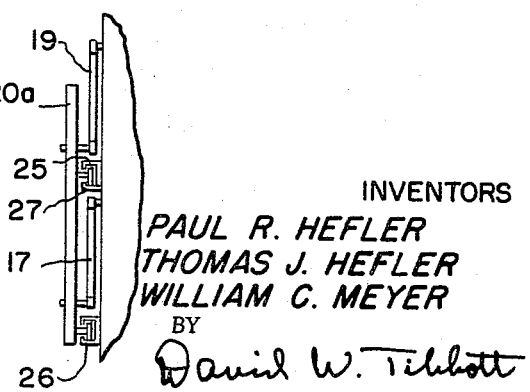
INVENTORS
PAUL R. HEFLER
THOMAS J. HEFLER
WILLIAM C. MEYER
BY
David W. Tibbott
ATTORNEY July 18, 1967  P. R. HEFLER ET AL  3,331,394
GAS VALVE Filed Nov. 23, 1964  2 Sheets-Sheet 2

INVENTORS
PAUL R. HEFLER
THOMAS J. HEFLER
WILLIAM C. MEYER
BY
David W. Tillott
ATTORNEY

United States Patent Office 3,331,394
Patented July 18, 1967

3,331,394
GAS VALVE
Paul R. Hefler, Thomas J. Hefler, and William C. Meyer, Easton, Pa., assignors to Ingersoll-Rand Company, New York, N.Y., a corporation of New Jersey
Filed Nov. 23, 1964, Ser. No. 412,945
4 Claims. (Cl. 137—610)

This invention relates to the art of gas flow control valves and particularly to valves for use at the junction of three gas conduits for diverting gas flow through one conduit into either one of the other two conduits.

Conventional gas flow valves for use at three-way junctions of gas conduits are not satisfactory for use in extremely large diameter conduits, say, one having a diameter of five feet or more, particularly when the diversion of gas flow must occur quickly. Generally, this is because the surfaces of such valves are so large that they have to be excessively massive and bulky to withstand the large forces acting on them by the flowing gas. The use of an unbalanced valve of conventional design in such large conduits will usually result in the application of excessive forces on the valve tending either to slam it shut or to open it too rapidly. Conventional valves of a balanced design tend to be affected by any deposits on the operating portions of the valve so that they become unreliable in operation. In addition, valves of a balanced design are usually not satisfactory when the diversion of flow should not be accompanied by a momentary blockage of flow.

The principal object of this invention is to provide a valve which substantially overcomes or minimizes the foregoing objections.

Other important objects are: to provide a valve which is of relatively lightweight construction and which can be satisfactorily used in large-diameter gas conduits; to provide a gas valve which is capable of fast operation; to provide a gas valve which is not substantially affected by build-up of deposits of solid matter on it; to provide a gas valve for use in large conduits and which has relatively low inertia during movement; to provide a gas valve for use in large conduits which can be operated with relatively low force; to provide a gas valve which can tightly close a gas conduit; and to provide a novel and improved gas valve.

Briefly, these objects are attained in a gas flow valve including a three-way conduit junction for use in a gas flow conduit and having an inlet leg and two outlet legs; a central damper pivoted in the junction substantially midway between the two outlet legs where it can pivot to alternate positions extending partially across each of said outlet legs; a side damper pivoted in each of said outlet legs and movable between a closing position wherein it cooperates with said central damper to close its outlet leg and an opening position wherein it does not substantially obstruct the flow of gas into its outlet leg; and actuating means interconnecting said dampers together for simultaneous movement between alternate positions wherein said side dampers are moved alternately into their closing and opening positions with the side damper which is in its closing position cooperating with the central damper to close that outlet leg while the other outlet leg is open.

The invention is described in connection in connection with the drawings wherein:

FIG. 1 is a longitudinal section of a junction containing three gas conduit legs illustrating the gas valve of this invention closing one outlet conduit leg;

FIG. 2 is similar to FIG. 1 and shows the gas valve in an alternative position closing the other outlet conduit leg;

FIG. 3 is a view of FIG. 1 taken along the line 3—3;

FIG. 4 is a fragmentary elevational view of a gas conduit junction showing another embodiment of valve operating mechanism;

FIG. 5 is a fragmentary vertical view taken at right angles to FIG. 4; and

Figure 6:
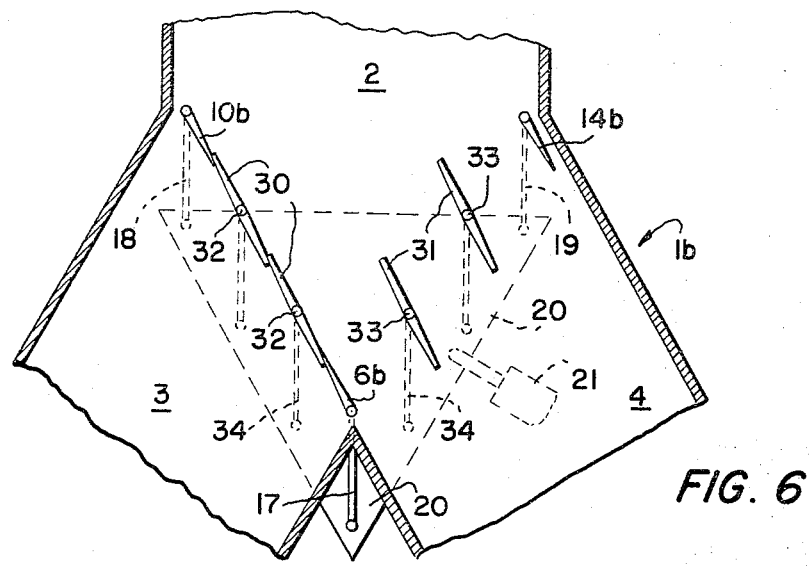
FIGS. 6 and 7 are views similar to FIGS. 1 and 2 and show a third embodiment of gas valve.

A three-way gas conduit junction 1 is shown in FIGS. 1, 2, and 3, having an inlet leg 2 and a pair of outlet legs 3 and 4. The junction 1 is sometimes described as a Y-type of junction with the stem of the Y corresponding to the inlet leg 2 and the arms of the Y corresponding to the outlet legs 3 and 4. The legs 2, 3, and 4 are preferably rectangular in cross section, instead of having a cylindrical cross section. The legs 2, 3, and 4 can be joined to gas conduits (not shown) in a conventional manner.

A central damper 6 is pivoted about an axis 7 located immediately adjacent the apex 8 between the two outlet legs 3 and 4. The central damper 6 extends along the axis 7 substantially the entire distance between the side walls of the junction 1 and is wide enough to extend a little more than half-way across each outlet leg 3 and 4, proceeding in a direction at right angles to the damper axis 7.

A side damper 10 is pivoted on an axis 11 extending adjacent the corner 12 between the inlet leg 2 and the outlet leg 3. A corresponding side damper 14 is pivoted on an axis 15 lying adjacent the corner 16 between the inlet leg 2 and the outlet leg 4. The side dampers 10 and 14 are about the same size as the central damper 6; each side damper 10 and 14 extends along its axis substantially the entire distance between the side walls of the junction 1 and is wide enough to extend a little more than half-way across its outlet leg, proceeding in a direction at right angles to the axis of the side damper. The side dampers 10 and 14 are sufficiently wide enough to overlap the central damper 6, when in a position alternately closing the outlet legs 3 and 4.

Each of the dampers 6, 10, and 14 include lever arms 17, 18 and 19 located outside of the junction 1 for controlling and operating the dampers 6, 10, and 14. The lever arms 17, 18, and 19 are connected together for simultaneous movement by having their outer ends pivoted to a common plate 20. A fluid cylinder 21 is shown for moving the common plate 20 between alternate positions, as illustrated in FIGS. 1 and 2. The inner end of the fluid cylinder 21 is pivoted to the common plate 20 and its outer end pivoted to a fixed support 22 so that the cylinder 21 can swing about the support 22 as it moves the common plate 20 between its alternate positions.

Although the pivots of each of the dampers 6, 10, and 14 are shown in the drawing at some distance from the interior of the junction 1, it should be understood that they will be close enough to the inside surface of the junction 1 to avoid much leakage between the pivoted edges of the dampers and the interior of the junction 1.

Operation

The junction 1 is shown in FIG. 1, the outlet leg 3 being closed by the central damper 6 and the side damper 10. At the same time, FIG. 1 shows the side damper 14 folded against the outer wall of the outlet leg 4, so that the outlet leg 4 is open. In closing the outlet leg 3, the central damper 6 overlaps the side damper 10.

The dampers are held in the positions shown in FIG. 1 by the gas pressure in the junction 1 acting on the central damper 6 forcing it outwardly along the outlet leg 3. Since the lever arms 17, 18, and 19 and common plate 20 constrain the central damper 6 to move in an opposite direction to the side dampers 10 and 14, the gas pressure forcing the central damper 6 outwardly along the outlet leg 3 acts to press the two dampers 6 and 10 tightly together. A portion of the force urging the dampers 6 and 10 together is also contributed by the effect of the gas acting on the open damper 14, forcing it toward its open position.

When it is desired to switch the gas flow passing through the outlet leg 4 to the outlet leg 3, the fluid cylinder 21 is operated toward an extended direction. Looking at FIGS. 1 and 2, extending the fluid cylinder 21 moves the common plate 20 toward the left, which simultaneously begins swinging the lever arms 17, 18, and 19 in a clockwise direction. The clockwise movement of the lever arms 17, 18, and 19 results in the simultaneous movement of all the dampers 6, 10 and 14 in a clockwise direction, as shown in FIGS. 1 and 2.

As a result, the damp 10 begins opening the outlet leg 3 and the damper 14 begins closing the outlet leg 4. Initially, the gas pressure continues urging the central damper 6 toward the left. This is caused by the gas pressure acting on the right face of the damper 6, as shown in FIG. 1. However, the gas biasing force acting on the damper 6 changes direction after the damper 6 moves more than half-way toward its alternate position shown in FIG. 2. In other words, after the damper 6 passes through its vertical midway position, looking at FIG. 1, the gas pressure begins acting on the left face of the damper 6 and urging it toward the right into the position shown in FIG. 2.

Ultimately, the common plate 20 and dampers 6, 10, and 14 will reach the alternate positions shown in FIG. 2. In FIG. 2, the outlet leg 3 is open and the outlet leg 4 is closed. The gas pressure in the junction 1 is urging the central and side dampers 6 and 14 tightly together in an overlapped relationship and is urging the side damper 10 against the outer wall of the outlet leg 3 toward an open position.

*Second embodiment—FIGS. 4 and 5*

The second embodiment 1a, shown in FIGS. 4 and 5, is identical to the first embodiment except for the means to simultaneously operate the dampers 6, 10, and 14. In this embodiment, the common plate 20 is replaced with a plate 20a mounted to slide linearly (along a horizontal path in FIG. 4). The plate 20a carries a series of rollers 25 mounted on its rear face, looking at FIG. 4, and riding in C-shaped channel tracks 26 and 27 fixed on the side of the junction 1a. A fluid cylinder 21a is provided for moving the plate 20a back and forth. The outer or free ends of the lever arms 17, 18, and 19 are slidably mounted in vertical slots 28 formed in the plate 20a. As the plate 20a moves linearly, the ends of the lever arms 17, 18, and 19 slide vertically in the slots 28 to swing the dampers 6, 10, and 14 simultaneously.

Figure 7:
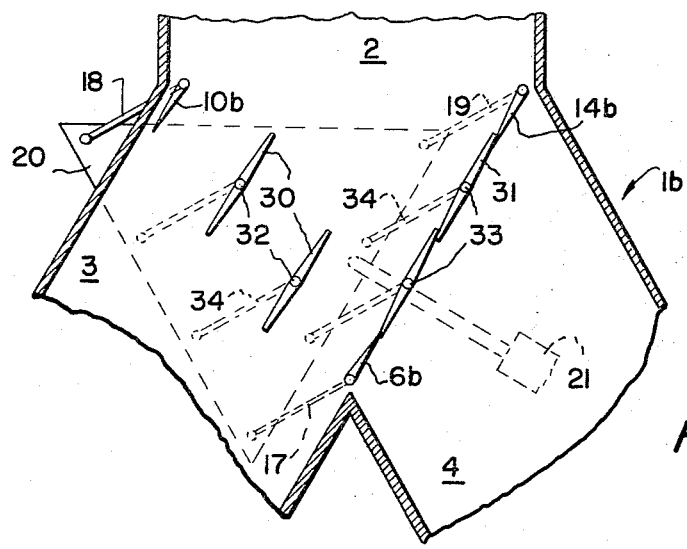

*Third embodiment—FIGS. 6 and 7*

The third embodiment of junction 1b shown in FIGS. 6 and 7 differs from the first embodiment by the addition of butterfly valves 30 and 31 cooperating with the dampers 6b, 10b, and 14b, to open or close the outlet legs 3 and 4. The dampers 6b, 10b, and 14b are of less width than the dampers 6, 10, and 14 in the first embodiment to accommodate the use of the butterfly valves 30 and 31.

As shown in FIGS. 6 and 7, two butterfly valves 30 are pivoted in the outlet leg 3 on axes 32 and two butterfly valves 31 are pivoted in the outlet leg 4 on axes 33. Each of the butterfly valves 30 and 31 carries a lever arm 34 located outside the junction 1b, like the lever arms 17, 18, and 19. The outer ends of the lever arms 34 are pivoted to the common plate 20 also like the lever arms 17, 18, and 19. As a result of this arrangement, the movement of the common plate 20 simultaneously swings the dampers 6, 10, and 14 and the butterfly valves 30 and 31.

As is well known, the biasing forces on the butterfly valves 30 and 31 by the gas pressure in the junction 1b are substantially balanced. Hence, the only unbalanced forces are the result of the gas pressure acting on the face area of the central damper 6b. Since the central damper 6b is smaller than the central damper 6 in the first embodiment, due to the use of the butterfly valves 30 and 31, the forces acting on the gas valve are less. This last embodiment is particularly useful in large gas conduits where the face areas of the valve dampers become large particularly when the inertia forces on the valve must be limited to low magnitudes.

It will be understood that although three embodiments of the invention are specifically described, the invention may embrace various other embodiments which are obvious from an understanding of the described embodiment and are embraced within the claims of the invention.

Having described our invention, we claim:
1. A gas flow valve comprising:
 (a) a three-way conduit junction for use in a gas flow conduit and having an inlet leg and two outlet legs;
 (b) a central damper pivoted in the junction substantially midway between the two outlet legs where it can pivot to alternate positions extending partially across each of said outlet legs;
 (c) a side damper pivoted in each of said outlet legs and movable between a closing position wherein it cooperates with said central damper to close its outlet leg and an opening position wherein it does not substantially obstruct the flow of gas into its outlet leg; and
 (d) actuating means interconnecting said dampers together for simultaneous movement between alternate positions wherein said side dampers are moved alternately into their closing and opening positions with the side damper which is in its closing position cooperating with the central damper to close that outlet leg while the other outlet leg is open.

2. The gas flow valve of claim 1 wherein:
 (a) said three-way junction is a Y-type junction with the stem of the Y being the inlet leg of the junction; and
 (b) said central damper is pivoted on an axis adjacent the apex of the two diverging arms of the Y-type junction.

3. The gas flow valve of claim 2 wherein:
 (a) each of said side dampers is pivoted on an axis located adjacent the corner formed between said stem and one of said diverging arms of said Y-type junction.

4. The gas flow valve of claim 1 including:
 (a) a butterfly valve pivoted in at least one of said outlet legs intermediate one of said side dampers and said central damper to cooperate with said one side damper and said central damper to close said one outlet leg; and
 (b) means connecting said butterfly valve to said actuating means for simultaneously moving said butterfly valve with said dampers between alternate positions closing and opening said one outlet leg.

No references cited.

WILLIAM F. O'DEA, *Primary Examiner.*

D. H. LAMBERT, *Assistant Examiner.*